(12) United States Patent
Chang (10) Patent No.: US 9,176,261 B2
(45) Date of Patent: Nov. 3, 2015

(54) OPTICAL LENS ASSEMBLY, ARRAY TYPE LENS MODULE AND METHOD OF MAKING THE ARRAY TYPE LENS MODULE

(71) Applicant: GLOBAL MICROPTICS CO., LTD., Tainan (TW)

(72) Inventor: Tsung-Chieh Chang, Tainan (TW)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 0 days.

(21) Appl. No.: 14/182,120

(22) Filed: Feb. 17, 2014

(65) Prior Publication Data

US 2015/0234154 A1    Aug. 20, 2015

(51) Int. Cl.
*G02B 3/00*    (2006.01)
*B29C 43/18*   (2006.01)
*B29D 11/00*   (2006.01)
*B29K 63/00*   (2006.01)

(52) U.S. Cl.
CPC .............. *G02B 3/0062* (2013.01); *B29C 43/18* (2013.01); *B29D 11/00317* (2013.01); *G02B 3/0006* (2013.01); *G02B 3/0012* (2013.01); *G02B 3/0037* (2013.01); *G02B 3/0068* (2013.01); *B29K 2063/00* (2013.01)

(58) Field of Classification Search
CPC .... G02B 3/0006; G02B 3/0012; G02B 3/005; G02B 3/0056; G02B 3/0062; G02B 3/0068; B29D 11/00278; B29D 11/00298; B29D 11/00365; B29D 11/0073
See application file for complete search history.

(56) References Cited

U.S. PATENT DOCUMENTS

| | | | | |
|---|---|---|---|---|
| 6,122,109 A * | 9/2000 | Peake et al. | ................... | 359/620 |
| 6,324,010 B1 * | 11/2001 | Bowen et al. | ................. | 359/622 |
| 6,473,238 B1 * | 10/2002 | Daniell | ......................... | 359/622 |
| 6,903,883 B2 * | 6/2005 | Amanai | ......................... | 359/819 |
| 6,954,311 B2 * | 10/2005 | Amanai | ......................... | 359/621 |
| 7,242,526 B2 * | 7/2007 | Nemoto et al. | ............... | 359/626 |
| 7,894,139 B2 * | 2/2011 | Yamagata et al. | ............. | 359/619 |
| 8,289,635 B2 * | 10/2012 | Rossi et al. | .................... | 359/796 |
| 8,542,309 B2 * | 9/2013 | Yamada et al. | ............... | 348/340 |

* cited by examiner

*Primary Examiner* — David N Spector
(74) *Attorney, Agent, or Firm* — Baker & McKenzie LLP (57) ABSTRACT

An optical lens assembly includes a sensor array, a lens array, and a shading element. The sensor array has a plurality of sensors arranged as a matrix to convert optical signals into electrical signals. The lens array has a plurality of lens units arranged as a matrix. The lens array is provided on the sensor array, and the lens units are aligned with the sensors to focus light onto the sensors respectively. The lens units are made of a light curable material or a thermosetting material, and separated from each other to form a trench between each two of the neighboring lens units. The shading element is received in the trenches of the lens array to avoid light which goes into any one of the lens units from entering into the other lens units.

12 Claims, 7 Drawing Sheets

Figure 1:
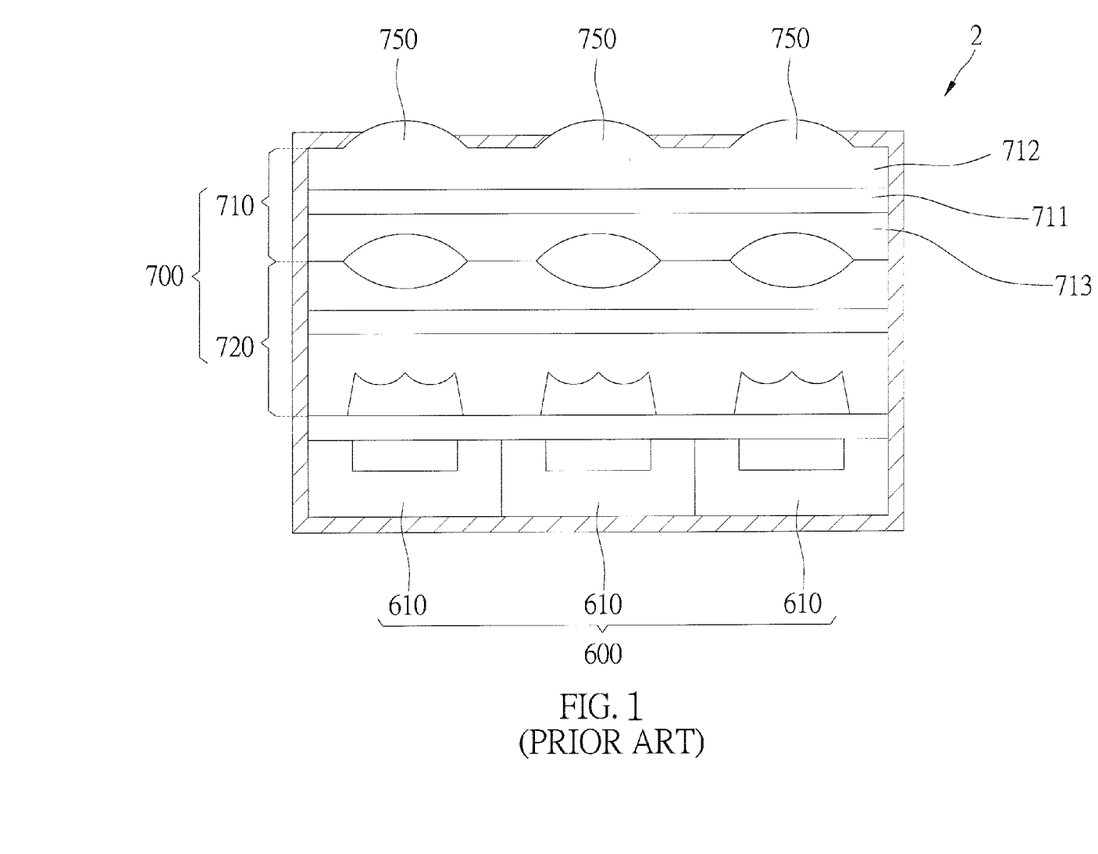
FIG. 1 is a sectional view of the conventional optical lens assembly.

FIG. 8 and lead to lowering of the quality of the final image. Besides, the glass substrates in the lenses 710, 720 still take some spaces, which is not helpful to reducing the thickness of the lens assembly.

OPTICAL LENS ASSEMBLY, ARRAY TYPE LENS MODULE AND METHOD OF MAKING THE ARRAY TYPE LENS MODULE

BACKGROUND OF THE INVENTION

1. Technical Field

The present invention relates generally to an optical device, and more particularly to an optical lens assembly, an array type lens module, and a method of making the array type lens module.

2. Description of Related Art

In recent days, more and more image pick-up apparatus, such as digital camera and cell phone, are equipped with an image capture device, such as charge coupled device (CCD) or complementary metal oxide semiconductor (CMOS), and theses image pick-up apparatus are made as smaller as possible so that the image capture devices are asked as smaller as possible as well.

FIG. 1 shows a conventional miniature lens assembly 2, including a sensor array 600 and a lens array 700 on the sensor array 600. The sensor array 600 has a plurality of sensors 610 arranged as a matrix, and the lens array 700 has a plurality of lens unit 750 arranged as a matrix and aligned with the sensors 610 respectively. Light is focused on the sensors 610 through the lens modules 750 respectively, so that each sensor 610 may get a temporary image.

With a specific imaging software, it may combine the temporary images from the sensors 610 to obtain a high quality final image. In such miniature lens assembly 2, the sensors 610 of the sensor array 600 with low pixel may obtain the high quality image, and therefore each lens unit 750 only needs a few lenses, which is helpful to narrow the size of the lens assembly.

A conventional way of making the lenses 710 of the lens array 700 is to pour the molten epoxy on a glass substrate 711, and then press it with a mold to form a first lens layer 712 on a side of the glass substrate 711, and then turn over the glass substrate 711, and do the same procedures again to form a second lens layer 713 on the other side of the glass substrate 711. The first lens layer 712, the glass substrate 711, and the second lens layer 713 form the lenses 710. FIG. 1 shows there are two sets of lenses 710, 720, and the lens 720 is made by the same method. While light is entering the lens unit 750, some oblique beams may enter the other lens unit 750 through the lens layers or the glass substrates that interferes with the imaging of the sensors 610 of the sensor array 600, and lead to lowering of the quality of the final image. Besides, the glass substrates in the lenses 710, 720 still take some spaces, which is not helpful to reducing the thickness of the lens assembly.

BRIEF SUMMARY OF THE INVENTION

In view of the above, the primary objective of the present invention is to provide an optical lens assembly, an array type lens module, and a method of making the array type lens module, which may reduce the thickness and avoid the light interference problem.

The present invention provides an optical lens assembly, including a sensor array, a lens array, and a shading element. The sensor array has a plurality of sensors arranged as a matrix to convert optical signals into electrical signals. The lens array has a plurality of lens units arranged as a matrix. The lens array is provided on the sensor array, and the lens units are aligned with the sensors to focus light onto the sensors respectively. The lens units are made of a light curable material or a thermosetting material, and separated from each other to form a trench between each two of the neighboring lens units. The shading element is received in the trenches of the lens array to avoid light which goes into any one of the lens units from entering into the other lens units.

The present invention further provides an array type lens module, including a lens array and a shading element. The lens array has a plurality of lens units to change an optical character of light going therethrough, wherein the lens units are arranged as a matrix, and separated from each other to form a trench between each two of the neighboring lens units. The shading element is received in the trenches of the lens array to avoid light which goes into any one of the lens units from entering into the other lens units.

The present invention further provides a method of making an array type lens module, comprising the following steps:

A. Form a lens member, wherein the lens member is made of a light curable material or a thermosetting material, and has a plurality of lens units;

B. Remove portions of the lens member between the lens units to form trenches between the lens units; and C. Provide a shading element in the trenches to avoid light which goes into any one of the lens units from entering into the other lens units.

In an embodiment, the method further includes the step of cutting the lens member along with the shading element to obtain a plurality of the array type lens modules.

With the aforementioned design, it could make the optical lens assembly thinner, and eliminate the light interference problem.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 2:
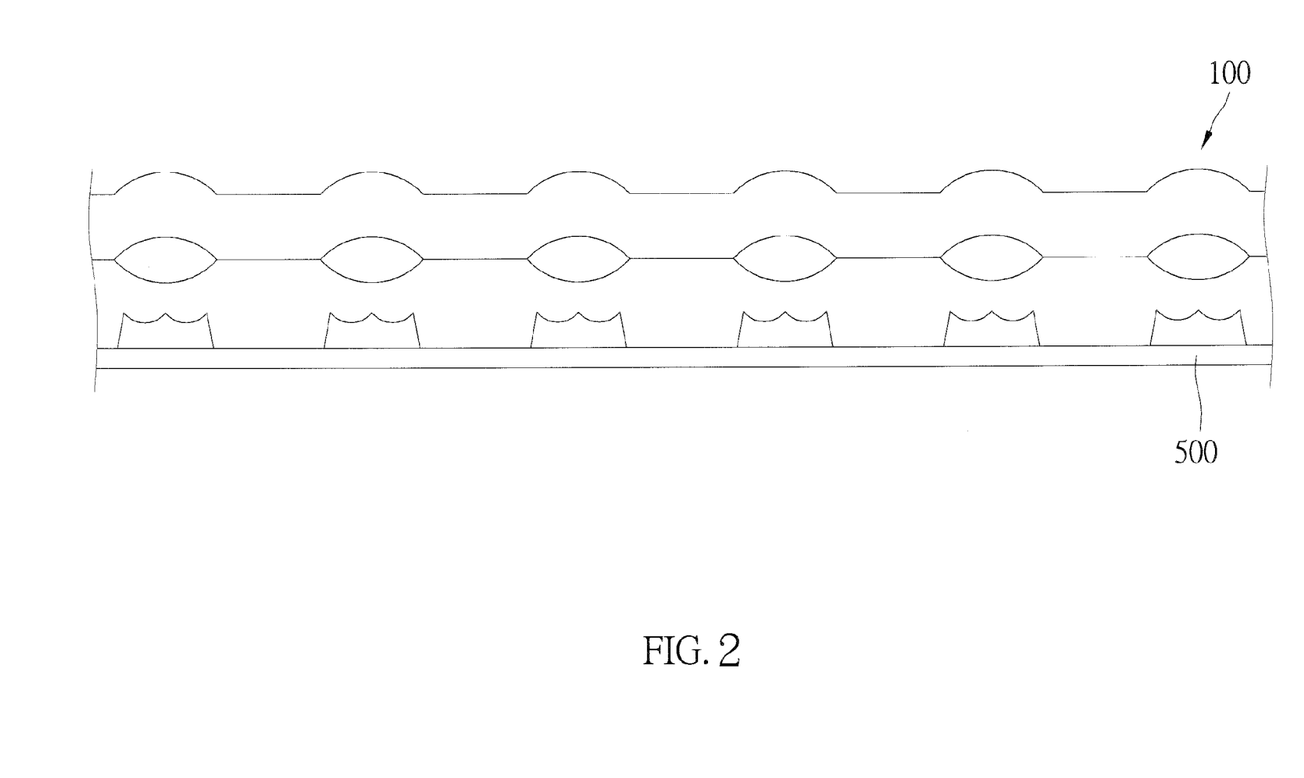
FIG. 2 to FIG. 6 are sectional views, showing the procedures of making the array type lens module of a preferred embodiment of the present invention.

As shown in FIG. 2 to FIG. 6, a method of making an array type lens module is described hereunder. As shown in FIG. 2, a lens member 100 is molded on a substrate 500. The lens member 100 is made of UV curing epoxy, and the UV curing epoxy is pressed by a mold (not shown) and exposed under an UV light for curing to form the lens member 100. In practice, any light curable material or thermosetting material may be used to form the lens member 100.

Figure 3:
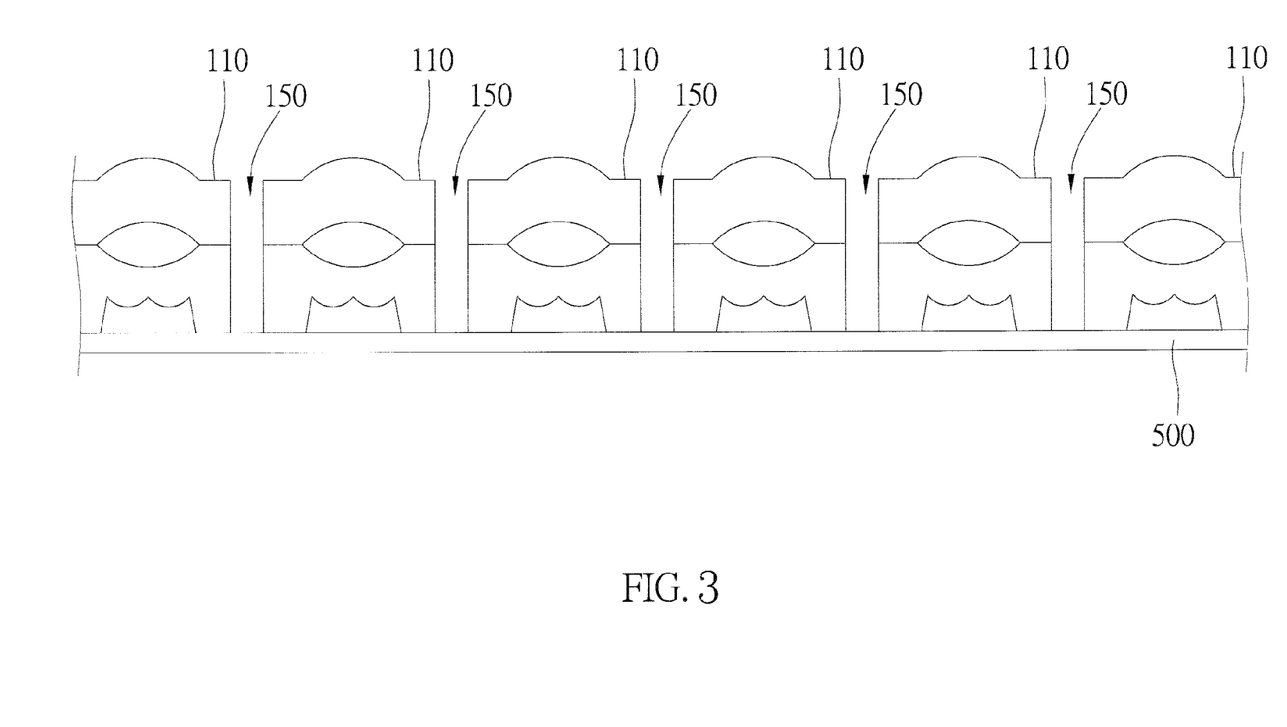

As shown in FIG. 3, removes specific portions of the lens member 100 to obtain a plurality of lens units 110. The lens units 110 are separated from each other and arranged as a matrix. Each lens unit 110 changes optical characters of light which goes therethrough. The removing portions are between the lens units 110 to form a plurality of trenches 150. In an embodiment, this step is performed in a milling machine, and etching, grinding, and other equivalent processes may be involved in this step.

Figure 4:
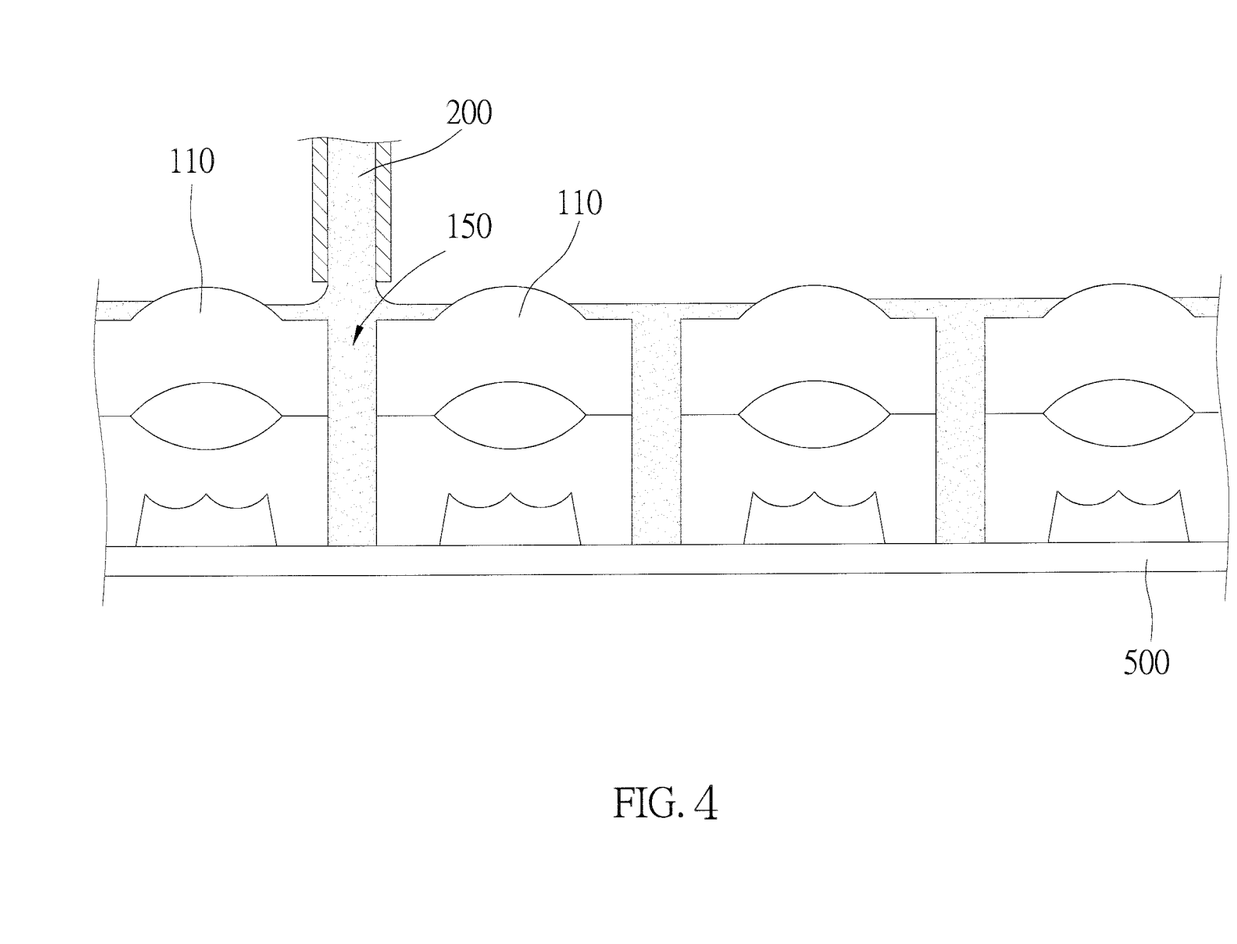
Figure 5:
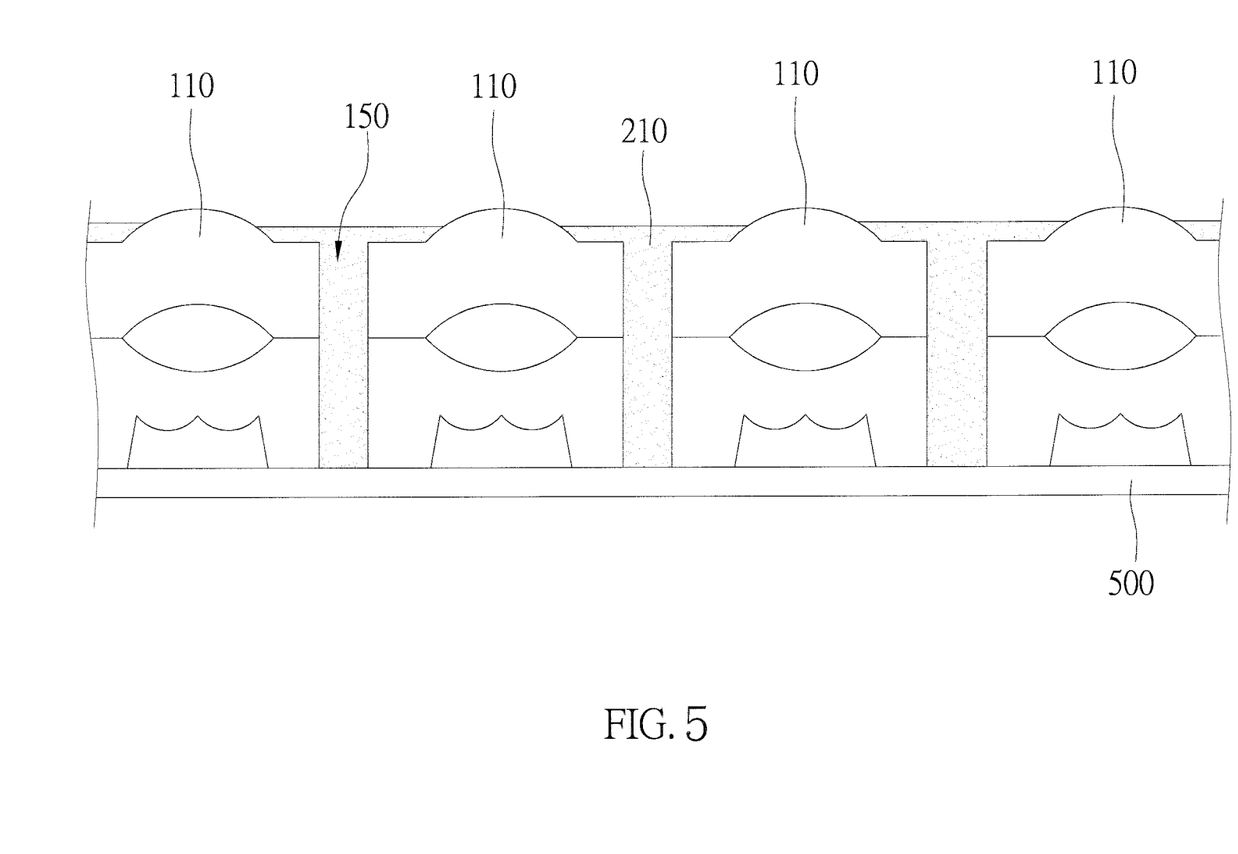
Figure 6:
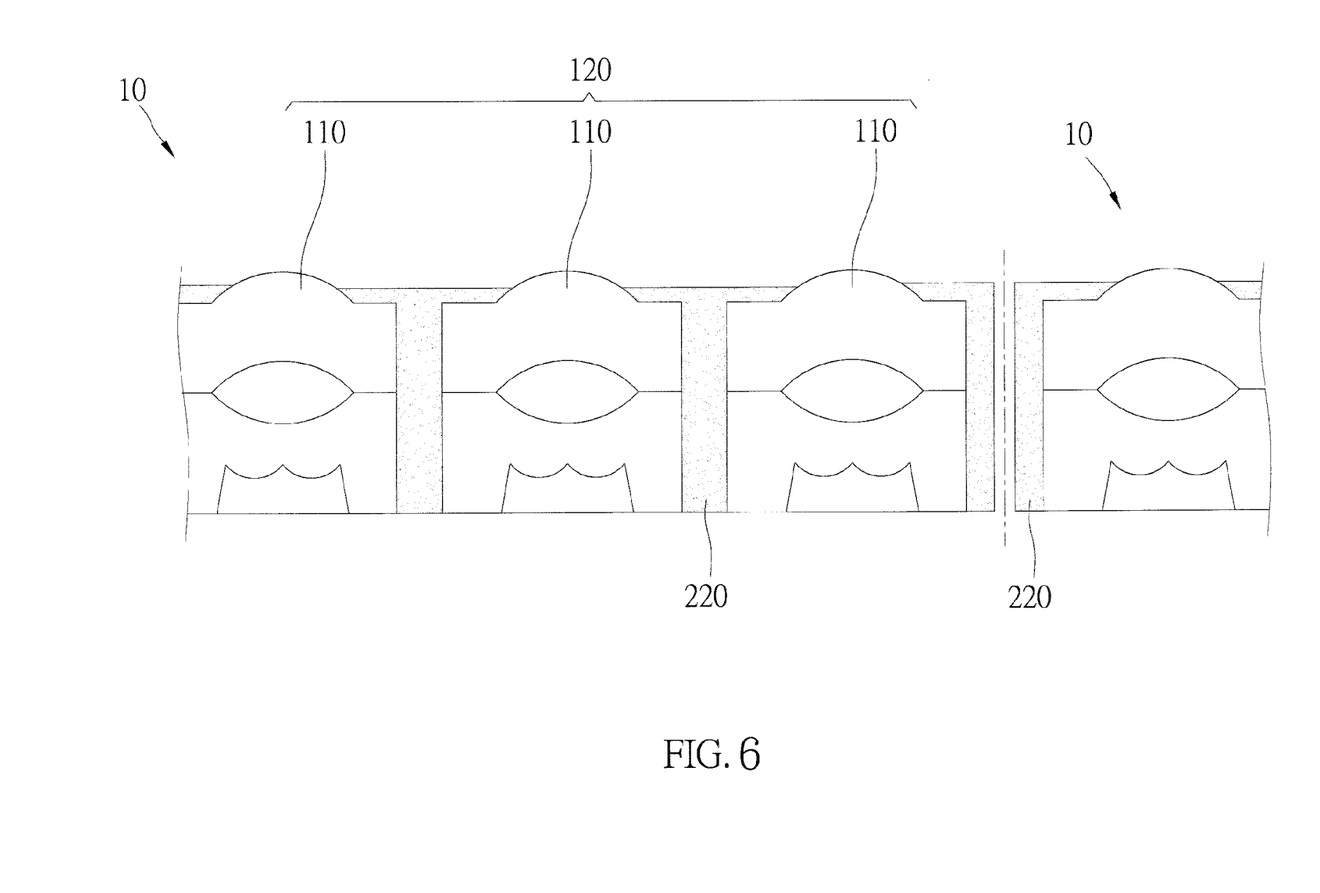

As shown in FIG. 4, the trenches 150 of the lens member 100 are filled with a molten shading material 200. The shading member 150 is blackout, and is made of a UV curing material. The molten shading material 200 is slightly overfilled to sink a top of the lens member 100, but still lets a portion of each lens unit 110 be exposed. Next, the shading material 200 is exposed under UV light for curing to form a shading member 210 (FIG. 5). In practice, any light curable material or thermosetting material may be used to form the shading member 210. In another embodiment, the shading member 210 is a solidified member fixed in the trenches 150 by adhesive, or squeezing it in the trenches 150.

The lens member 100 is cut along with a specific portion of the shading member 210 to obtain a plurality of array type lens modules 10 with a shading element 220. Each array type lens module 10 has a predetermined number of the lens units 110 arranged as a matrix and the shading members 210 between the neighboring lens units 110. The lens units 110 form a lens array 120, and a sum of columns and rows of the lens units 110 is equal to or greater than 3. In an embodiment, the array type lens module 10 has a 3×3 lens array 120, and each lens unit 110 has two lenses. In another embodiment, the lens array 120 may be 1×3, 4×4, 5×5, 4×3, 16×9, and so on, and the lens unit 110 may have a lens, three lenses, or more than three lenses. This cutting step may be omitted if the lens array 120 of the lens member 100 just satisfies the array type lens module 10.

Figure 7:
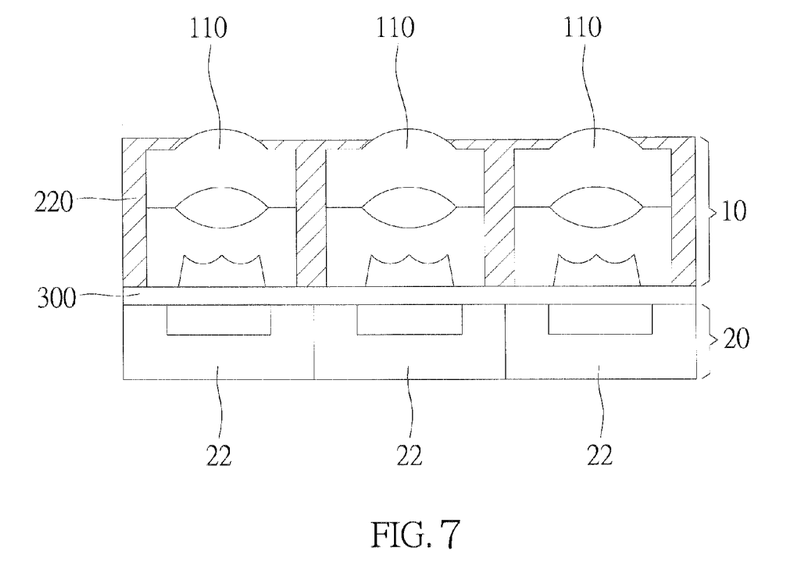
FIG. 7 is a sectional view of the optical lens assembly of the preferred embodiment of the present invention.
Figure 8:
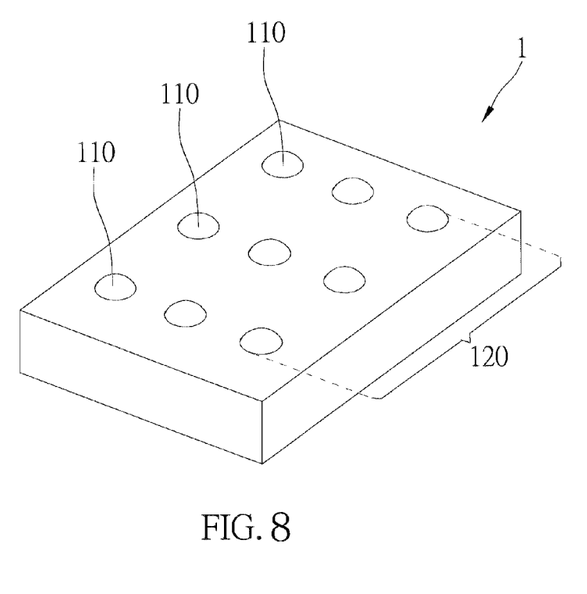
FIG. 8 is a perspective view of the optical lens assembly of the preferred embodiment of the present invention.

As shown in FIG. 7, the array type lens module 10 is mounted on a sensor array 30. In an embodiment, the sensor array 20 has a glass substrate 300 on a top thereof for protection, and the array type lens module 10 is mounted on the glass substrate 300. After a packaging process, it will get an optical lens assembly 1 as shown in FIG. 8. In an embodiment, the sensor array 20 has nine sensors 22 in a 3×3 matrix, and each sensor 22 converts optical signals into electrical signal. The sensors 22 are right under the lens units 110 of the lens array 120 respectively, so that light may be focused on each sensor 22 through the corresponding lens unit 110. The shading element 220 between the lens units 110 may block the light which goes into one lens unit 110 from entering into to the other lens units 110 to avoid the light interference problem. Furthermore, without the glass substrate in the lens array 120, the optical lens assembly 1 will be thinner.

It is noted that it may coat the shading material 200 on a lateral wall of each lens unit 110 or provide other shading members in the trenches 150 to form the shading element 220. With the embodiment as described above, the shading element 220 covers an outer lateral side and a top (except the lens units 110) of the array type lens module 10. So, the array type lens module 10 is an integrated block with the lens units 110 as a matrix layout on a top thereof.

In an embodiment, the array type lens module 10 is directly attached to the sensor array 20, which means there will be no glass substrate in the optical lens assembly. The array type lens module 10 replaces the glass substrate 300 to be a protection of the sensor array 20.

It must be pointed out that the embodiments described above are only some preferred embodiments of the present invention. All equivalent structures and methods which employ the concepts disclosed in this specification and the appended claims should fall within the scope of the present invention.

What is claimed is:

1. A method of making an array type lens module, comprising the steps of:

A. forming a lens member, wherein the lens member is made of a light curable material or a thermosetting material, and has a plurality of lens units;
   B. removing portions of the lens member between the lens units to form trenches between the lens units;
   C. providing a shading element in the trenches to avoid light which goes into any one of the lens units from entering into the other lens units; and
   D. cutting the lens member along with the shading element to obtain a plurality of the array type lens modules;
   wherein the trenches extend from a top to a bottom of the lens member to totally separate the lens units from each other.

2. The method of claim 1, wherein the step of providing the shading member in the trenches includes fixing a solidified shading member in the trenches.

3. The method of claim 1, wherein the lens units in each array type lens module are arranged as a matrix, and a sum of columns and rows of the matrix is equal to or greater than three.

4. The method of claim 1, wherein the step of providing the shading element in the trenches includes filling the trenches with a shading material, and solidifying the shading material.

5. The method of claim 4, wherein the shading material is made of a light curable material, and the shading material is exposed to light with a specific intensity for a certain time for solidification.

6. An array type lens module, comprising:
   a lens array having a plurality of lens units to change an optical character of light going therethrough, wherein the lens units are arranged as a matrix, and separated from each other to form a trench between each two of the neighboring lens units; and
   a shading element received in the trenches of the lens array to avoid light which goes into any one of the lens units from entering into the other lens units;
   wherein the trenches extend from a top to a bottom of the lens member to totally separate the lens units from each other.

7. The array type lens module of claim 6, wherein the shading element is made of a light curable material or a thermosetting material.

8. The array type lens module of claim 6, wherein a sum of columns and rows of the matrix is equal to or greater than three.

9. The array type lens module of claim 6, wherein the shading element is attached to sidewalls of the trenches.

10. The array type lens module of claim 9, wherein the shading element covers an outer lateral side of the lens array.

11. An optical lens assembly, comprising:
    a sensor array having a plurality of sensors arranged as a matrix to convert optical signals into electrical signals;
    a lens array having a plurality of lens units arranged as a matrix, wherein the lens array is provided on the sensor array, and the lens units are aligned with the sensors to focus light onto the sensors respectively; the lens units are made of a light curable material or a thermosetting material, and separated from each other to form a trench between each two of the neighboring lens units; and
    a shading element received in the trenches of the lens array to avoid light which goes into any one of the lens units from entering into the other lens units;
    wherein the trenches extend from a top to a bottom of the lens member to totally separate the lens units from each other.

12. The optical lens assembly of claim 11, wherein a sum of columns and rows of the matrix is equal to or greater than three.

\* \* \* \* \*